(12) United States Patent
Kim et al.

(10) Patent No.: US 12,457,121 B2
(45) Date of Patent: Oct. 28, 2025

(54) DEVICE FOR PROVIDING BLOCKCHAIN DID-BASED MULTI CLOUD SERVICE AND ITS OPERATING METHOD

(71) Applicant: BLOCKCHAIN LABS INC., Seoul (KR)

(72) Inventors: Yong Tae Kim, Seoul (KR); Byung Wan Lim, Seoul (KR)

(73) Assignee: BLOCKCHAIN LABS INC., Seoul (KR)

( * ) Notice: Subject to any disclaimer, the term of this patent is extended or adjusted under 35 U.S.C. 154(b) by 197 days.

(21) Appl. No.: 18/344,331

(22) Filed: Jun. 29, 2023

(65) Prior Publication Data

US 2024/0414014 A1    Dec. 12, 2024

(30) Foreign Application Priority Data

Jun. 9, 2023   (KR) .......................... 10-2023-0073929

(51) Int. Cl.

| | |
|---|---|
| *H04L 29/06* | (2006.01) |
| *G06F 21/60* | (2013.01) |
| *H04L 9/00* | (2022.01) |
| *H04L 9/08* | (2006.01) |
| *H04L 9/32* | (2006.01) |

(52) U.S. Cl.
CPC .............. *H04L 9/50* (2022.05); *G06F 21/602* (2013.01); *H04L 9/0861* (2013.01); *H04L 9/3247* (2013.01)

(58) Field of Classification Search
None
See application file for complete search history.

(56) References Cited

U.S. PATENT DOCUMENTS

2021/0176038 A1*  6/2021  Bortnikov ............... H04L 9/085

FOREIGN PATENT DOCUMENTS

| | | |
|---|---|---|
| JP | 2014511444 A * | 5/2014 |
| KR | 10-2179497 B1 | 11/2020 |
| KR | 20210138452 A * | 11/2021 |
| KR | 102451053 B1 * | 10/2022 |

* cited by examiner

*Primary Examiner* — Andrew J Steinle
(74) *Attorney, Agent, or Firm* — Studebaker Brackett PLLC (57) ABSTRACT

Disclosed is a cloud DID agent including a memory and at least one processor, in which the at least one processor is configured to receive an upload action request for a file from a mobile agent, generate an encryption key corresponding to the file in response to the upload action request and encrypt the file based on the encryption key, generate a plurality of chunks by dividing the encrypted file into a predetermined size, generate a plurality of data blocks corresponding to each of the plurality of chunks, and distribute and transmit the plurality of data blocks to a plurality of external cloud servers so that the plurality of data blocks are distributed and stored in the plurality of external cloud servers. In addition to this, various embodiments grasped through the specification are possible.

12 Claims, 7 Drawing Sheets

DEVICE FOR PROVIDING BLOCKCHAIN DID-BASED MULTI CLOUD SERVICE AND ITS OPERATING METHOD

CROSS-REFERENCE TO RELATED APPLICATION

This application claims priority to Korean Patent Application No. 10-2023-0073929 filed on Jun. 9, 2023, and all the benefits accruing therefrom under 35 U.S.C. § 119, the contents of which are incorporated by reference in their entirety.

BACKGROUND

The present disclosure relates to a technology for providing a cloud service based on blockchain technology without a central server device.

Many users use cloud services because of the convenience of uploading, downloading, and sharing files. An existing cloud service is operated in such a way that an entity providing a service, such as a specific company, own a server and leases the server to users. Therefore, the entity operating the cloud service has the right to access a file, etc. uploaded by the user.

SUMMARY

Since the entity providing the existing cloud service directly manages private data of the users, there is a possibility that private information of the users may be infringed. In addition, for sensitive data (e.g., medical data), there are various regulations on data, and institutions dealing with such sensitive data are often unable to use the cloud service and have to directly manage the data themselves.

Therefore, the present disclosure provides a device for providing a cloud service that can ensure private rights to a user's file and an operating method thereof, by designing such that even the entity providing the cloud service cannot have the right of access to data based on a decentralized identifier (DID) that can be retrieved through a public blockchain network.

In accordance with an exemplary embodiment of the present invention, a cloud DID agent includes a memory and at least one processor, and the at least one processor is configured to receive an upload action request for a file from a mobile agent, generate an encryption key corresponding to the file in response to the upload action request and encrypt the file based on the encryption key, generate a plurality of chunks by dividing the encrypted file into a predetermined size, generate a plurality of data blocks corresponding to each of the plurality of chunks, and distribute and transmit the plurality of data blocks to a plurality of external cloud servers so that the plurality of data blocks are distributed and stored in the plurality of external cloud servers.

In accordance with another exemplary embodiment of the present invention, a method for providing a cloud service includes receiving, by a cloud DID agent, an upload action request for a file from a mobile agent, generating, by the cloud DID agent, an encryption key corresponding to the file in response to the upload action request and encrypting the file based on the encryption key, generating, by the cloud DID agent, a plurality of chunks by dividing the encrypted file into a predetermined size, generating, by the cloud DID agent, a plurality of data blocks corresponding to each of the plurality of chunks, and distributing and transmitting, by the cloud DID agent, the plurality of data blocks to a plurality of external cloud servers so that the plurality of data blocks are distributed and stored in the plurality of external cloud servers.

BRIEF DESCRIPTION OF THE DRAWINGS

Exemplary embodiments can be understood in more detail from the following description taken in conjunction with the accompanying drawings, in which.

With regard to the description of the drawings, the same or similar reference numerals may be used for the same or similar components.

DETAILED DESCRIPTION OF EMBODIMENTS

Hereinafter, various embodiments of the present disclosure will be described with reference to the accompanying drawings. However, this is not intended to limit the present disclosure to specific embodiments, and should be understood to include various modifications, equivalents, and/or alternatives of the embodiment of the present disclosure.

Figure 1:
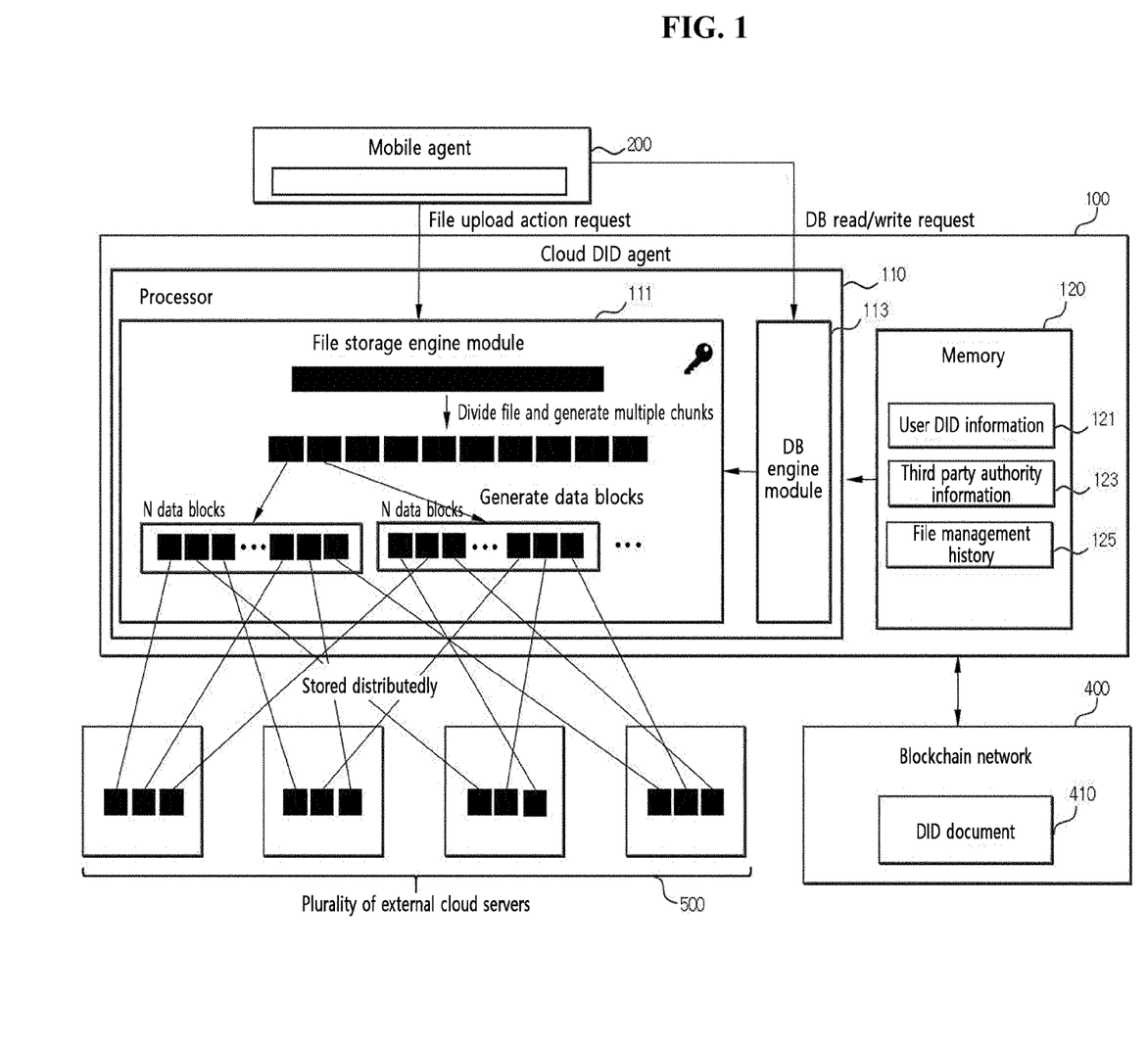
FIG. 1 is a block diagram of a cloud DID agent and an environment in which a cloud service is provided in accordance with exemplary embodiment of the present invention.

FIG. 1 is a block diagram of a cloud DID agent 100 and a diagram for illustrating an environment in which a cloud service is provided in accordance with exemplary embodiment of the present invention.

The cloud service according to an embodiment of the present invention may be provided to a mobile agent 200 through the cloud DID agent 100. On the cloud service, the cloud DID agent 100 may be identified by a DID of a user (hereinafter referred to as user DID) of the mobile agent 200 as an agent of the mobile agent 200. The mobile agent 200 may use the cloud service through the cloud DID agent 100.

In one embodiment, the cloud DID agent 100 and the mobile agent 200 may generate a pair of private key and public key based on an ECDSA encryption algorithm using secp256k1 curve, EdDSA algorithm using Ed25519 curve, or RSA encryption algorithm. A pair of the private key (hereinafter, user private key) and public key (hereinafter, user public key) may be used as an account of a blockchain network 400.

In one embodiment, the user public key may be used as the user DID. In various embodiments, the user DID may be a separate key from the user public key. The cloud DID agent 100 and the mobile agent 200 may generate an electronic signature (hereinafter referred to as user electronic signature) based on the user private key.

The blockchain network 400 may include at least one blockchain network among known public blockchain networks. A DID document 410 may be understood as a storage space for DIDs of entities on the cloud service. The entities on the cloud service can retrieve information (e.g., public key) associated with DIDs of other entities through the DID document 410. The management authority for the DID document 410 may be possessed by the cloud DID agent 100 or an agency server that manages a plurality of cloud DID agents (described later with reference to FIG. 3). A cloud service operation method to be described below is described according to the standard specifications of the World Wide Web Consortium (W3C) which is a web standardization organization.

Referring to FIG. 1, an example in which the mobile agent 200 requests a file upload action to the cloud DID agent 100 is illustrated. The mobile agent 200 may request various actions including file upload and download, DB read/write, etc. to the cloud DID agent 100, and the cloud DID agent 100 may execute actions in response thereto.

The cloud DID agent 100 may include a processor 110 and a memory 120. The processor 110 may include a plurality of processes and may control the overall operation of the cloud DID agent 100. The processor 110 may be configured to execute instructions stored in the memory 120 by being operably connected to the memory 120. Hereinafter, an operation performed by the cloud DID agent 100 may be understood to be performed by at least one processor 110.

The processor 110 may include a file storage engine module 111 and a DB engine module 113. The file storage engine module 111 may encrypt, divide, and distribute files uploaded by the mobile agent 200 and store the files in a plurality of external cloud servers 500. A function of the file storage engine module 111 will be described later in detail with reference to FIG. 2. The DB engine module 113 may access the file storage engine module 111 and distribute and store and manage files generated and modified in a process of storing data. The DB engine module 113 may be, for example, a DB supporting a key-value store interface or an SQL interface.

The memory 120 may store user DID information 121, third party authority information 123, and a file management history 125. The user DID information 121 may include a DID of a user, a user public key, and a user private key of the mobile agent 200 having control authority over the cloud DID agent 100. When receiving a specific request from the mobile agent 200, the cloud DID agent 100 may verify a user electronic signature included in the specific request based on the user DID information 121.

The third party authority information 123 includes authority information on a user other than the mobile agent 200. For example, authority for a third party may be set for each action type, such as retrieval authority, download authority, and DB read/write for a specific file. For example, action types permitted for the third party DID may be stored in the third party authority information 123.

The file management history 125 may include a history of files processed through the cloud DID agent 100. The file management history 125 may store a unique identifier (e.g., the hash value of a file) of a target file, an address of the file, a type of action processed for the file, a time stamp, etc.

In various embodiments, the unique identifier of the file and the address of the file may be the same. For example, the file may be stored in a storage space (not illustrated) of the cloud DID agent 100 implemented to be accessible through a content address. The storage space may include, for example, the memory 120 or an external storage (content addressable storage (CAS)) (e.g., InterPlanetary File System (IPFS)) where files are accessible through the content address. In this case, the address of the file (e.g., the hash value of the file) may be used as the unique identifier of the file.

In various embodiments, the address of the entire file may be referenced by a hash value of file data. By verifying the hash value, anyone can verify that the file data itself has not been changed since the hash value was generated.

The mobile agent 200 may include, for example, a portable communication device (e.g., a smart phone), a computer device, a portable multimedia device, a portable medical device, a camera, a wearable device, or a home appliance. An electronic device according to an embodiment of this document is not limited to the aforementioned devices.

Figure 2:
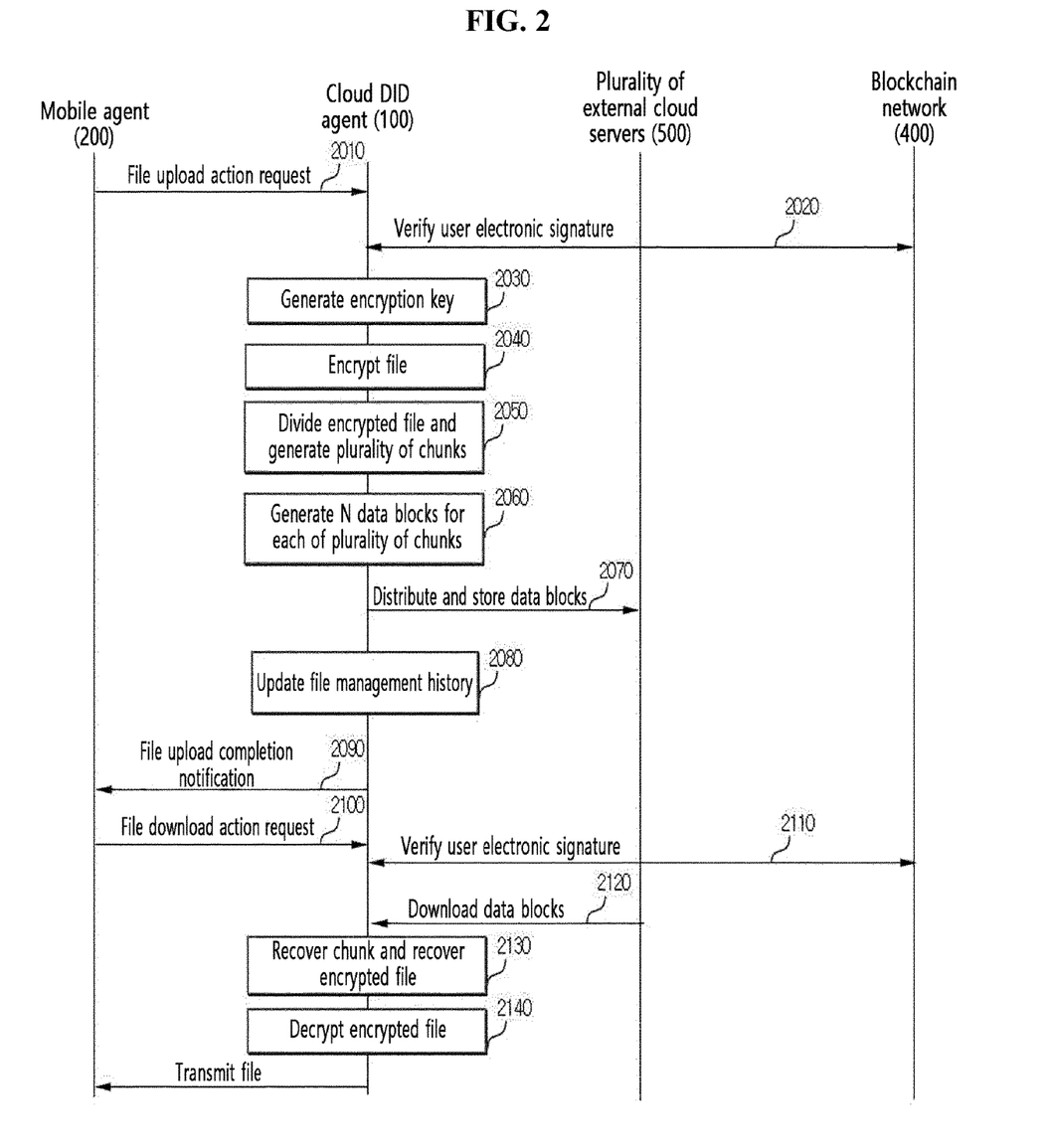
FIG. 2 is a sequence diagram of a method in which the cloud DID agent provides file upload and download functions in accordance with an exemplary embodiment of the present invention.

FIG. 2 is a sequence diagram of a method in which the cloud DID agent 100 provides file upload and download functions according to an embodiment. Hereinafter, the file upload and download functions will be described with reference to FIGS. 1 and 2.

The cloud DID agent 100 may receive an upload action request for a file from the mobile agent 200 (2010). The file upload action request may include an upload action command, a file to be uploaded, and a user electronic signature.

The cloud DID agent 100 may verify the user electronic signature included in the file upload action request through the blockchain network 400 based on the user DID stored in the user DID information 121 (2020).

The cloud DID agent 100 may generate an encryption key corresponding to the file (2030) and encrypt the file based on the encryption key (2040). The cloud DID agent 100 may generate a different encryption key for each file. For example, the encryption key can be a symmetric key, and only the cloud DID agent 100 that generated the encryption key can decrypt. The encryption key may be stored in the file management history 125 in correspondence with the unique identifier of the file.

The cloud DID agent 100 may generate a plurality of chunks by dividing the encrypted file into a predetermined size (2050). For example, the cloud DID agent 100 may generate a plurality of chunks in units of 10 MB. In this case, if the last chunk is 10 MB or less, the cloud DID agent 100 may generate a chunk of a certain size through data padding.

The cloud DID agent 100 may generate N data blocks corresponding to each of the plurality of chunks (2060). The cloud DID agent 100 may generate a predetermined first number of the plurality of data blocks by performing erasure coding on one chunk included in the plurality of chunks. For example, among erasure coding algorithms, a Reed-Solomon code algorithm may be applied thereto. One chunk may be recovered based on any second number of data blocks among the first number of plurality of data blocks. The first number may be greater than the second number. For example, when the cloud DID agent 100 generates 30 (first number) data blocks for one chunk using the erasure coding method, the original chunk can be recovered through freely selected 10 (second number) data blocks out of the 30 data blocks.

The cloud DID agent 100 may distribute and store the plurality of data blocks in the plurality of external cloud servers 500 (2070). When all of the plurality of data blocks corresponding to each of the plurality of chunks are stored in the plurality of external cloud servers 500, the file upload is completed.

If the file upload is completed, the cloud DID agent 100 may update the file management history 125 (2080). For example, an upload action, a file address, a time stamp value (information on the time when the upload action was completed), and access information about distributed and stored data blocks (e.g., address information about each data block) may be stored in the file management history 125. The cloud DID agent 100 may transmit a file upload completion notification to the mobile agent 200 (2090). The file upload completion notification may include the file address (e.g., hash value of the file) and the timestamp value.

As described above, on the cloud service, the file is not stored locally in the cloud DID agent 100, but may be distributed and stored in the external cloud servers 500. The external cloud servers 500 may be understood as independent data centers operated by different entities. Since the cloud DID agent 100 can recover one chunk if the cloud DID agent 100 has some data blocks among all data blocks generated through erasure coding, even if some data centers among the external cloud servers 500 are damaged, data recovery is possible. Therefore, the cloud DID agent 100 can stably provide the cloud service.

In addition, since the file uploaded by the user is stored in the plurality of external cloud servers 500 in units of data blocks, a single cloud server cannot know the original file only with the data blocks stored therein. To this end, the number of data blocks distributed and stored in one external cloud server may be set to a number (third number) smaller than the number (second number) with which one chunk can be recovered. Even if the second number of data blocks are acquired by the external server, since the file is encrypted in operation 2040, it is impossible to recover the original file.

Hereinafter, a method of processing a download action request for an uploaded file will be described.

The cloud DID agent 100 may receive a download action request for a specific file from the mobile agent 200 (2100). The download action request may include the file address and the user electronic signature. The cloud DID agent 100 may verify the user electronic signature included in the download action request through the blockchain network 400 based on the user DID stored in the user DID information 121 (2110).

The cloud DID agent 100 may download at least some of the plurality of data blocks corresponding to each chunk included in the plurality of chunks in order to recover the plurality of chunks corresponding to the file requested for the download action from the plurality of external cloud servers 500 (2120).

The cloud DID agent 100 may recover each chunk based on at least some of the downloaded data blocks and recover an encrypted file based on the plurality of recovered chunks (2130). The cloud DID agent 100 may decrypt the entire recovered encrypted file using the encryption key generated in operation 2030 (2140). The cloud DID agent 100 may transmit the decrypted file to the mobile agent 200.

Figure 3:
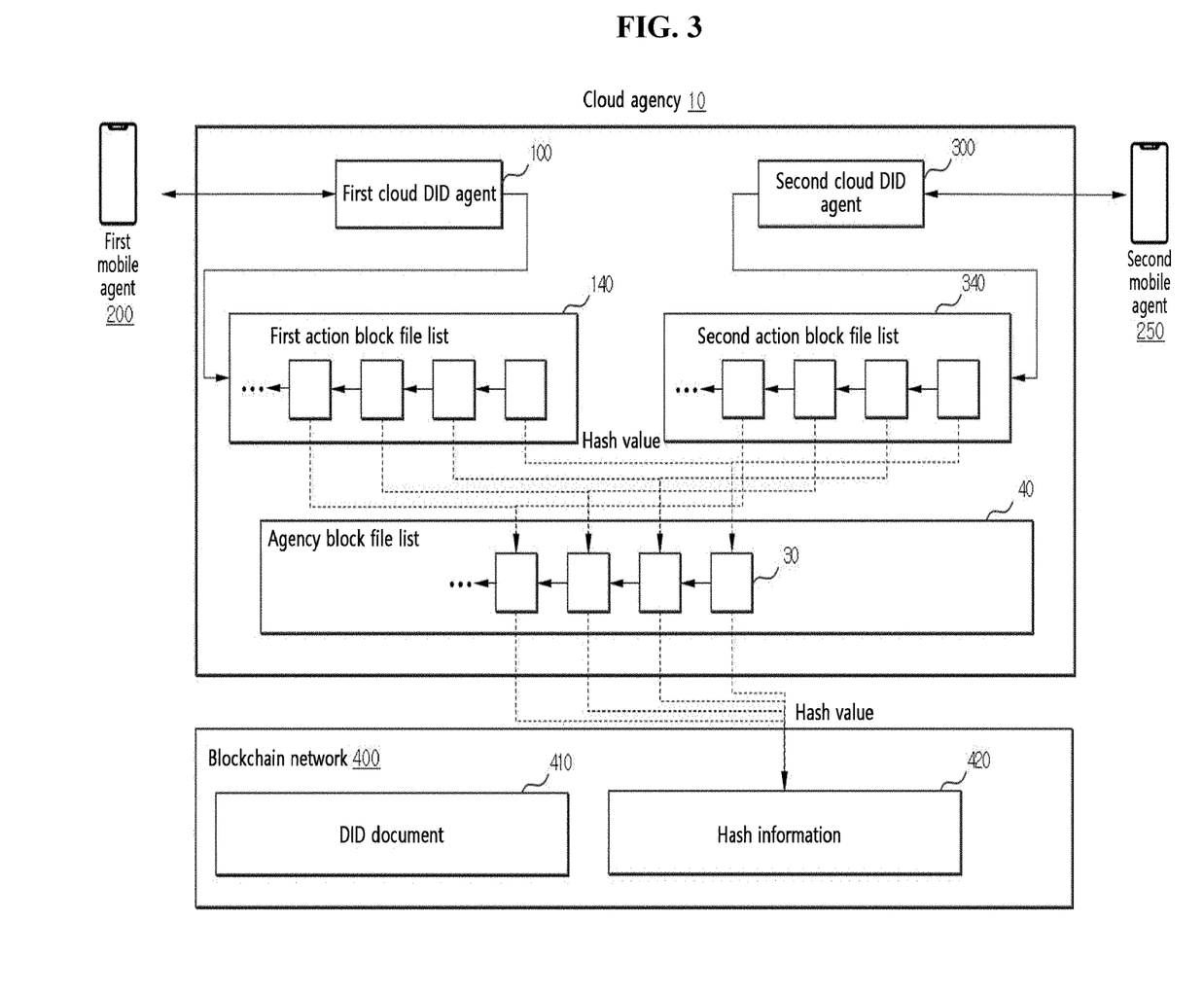
FIG. 3 is a structural diagram for illustrating a block file list structure designed to enable verification of actions performed by the cloud DID agent in accordance with another exemplary embodiment.
Figure 4:
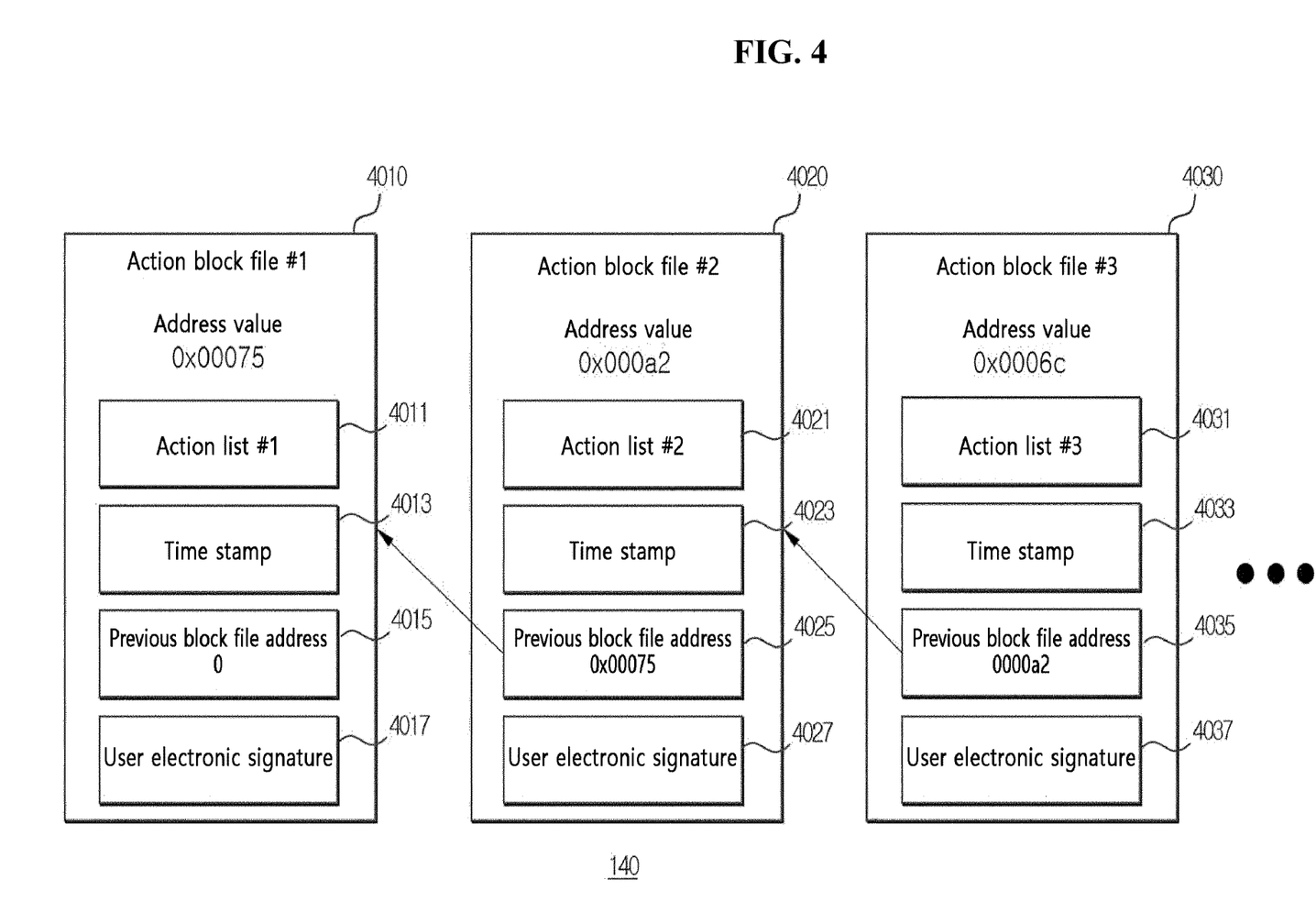
FIG. 4 is a structural diagram of an action block file list in accordance with another exemplary embodiment of the present invention.
Figure 5:
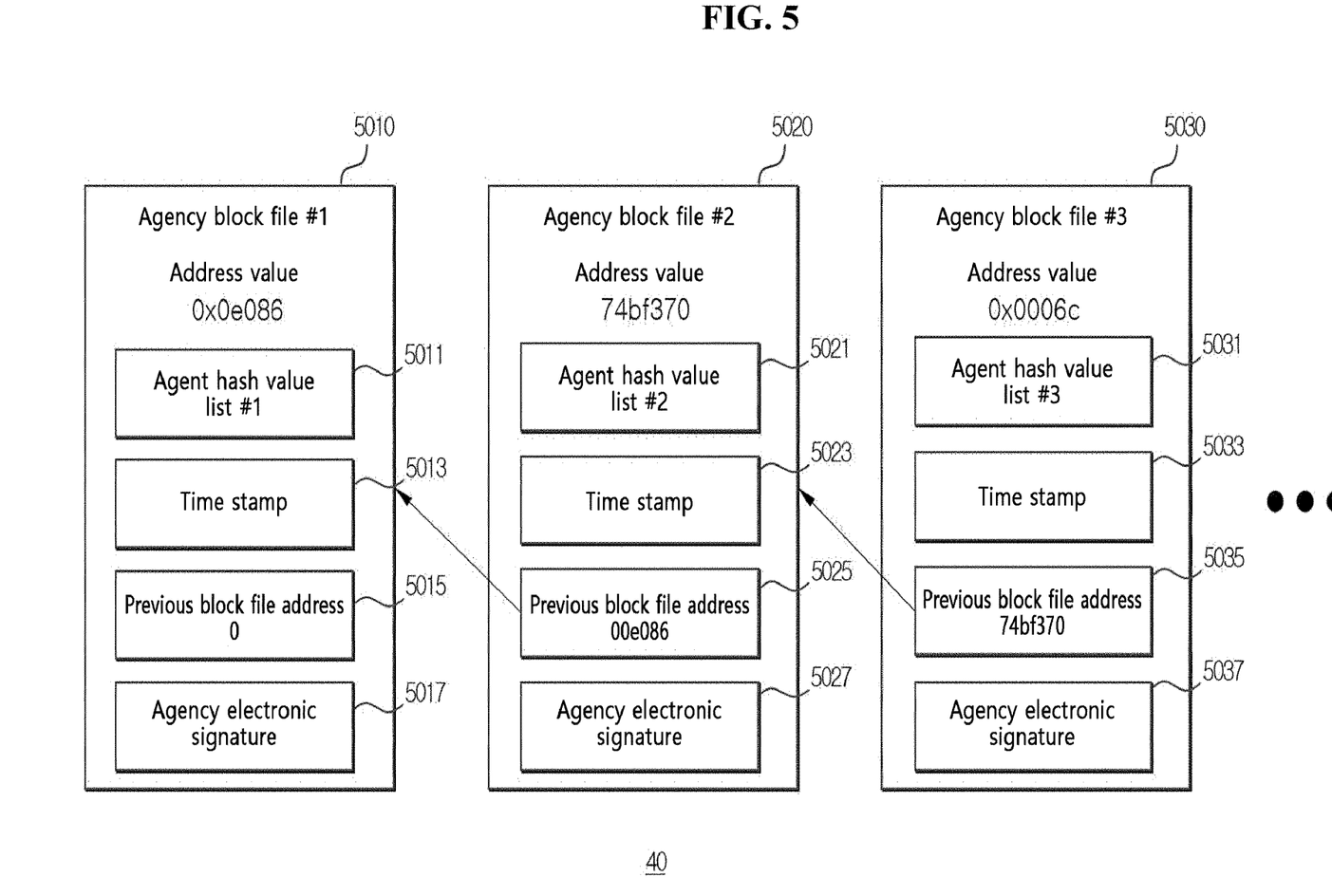
FIG. 5 is a structural diagram of an agency block file list in accordance with another exemplary embodiment.
Figure 6:
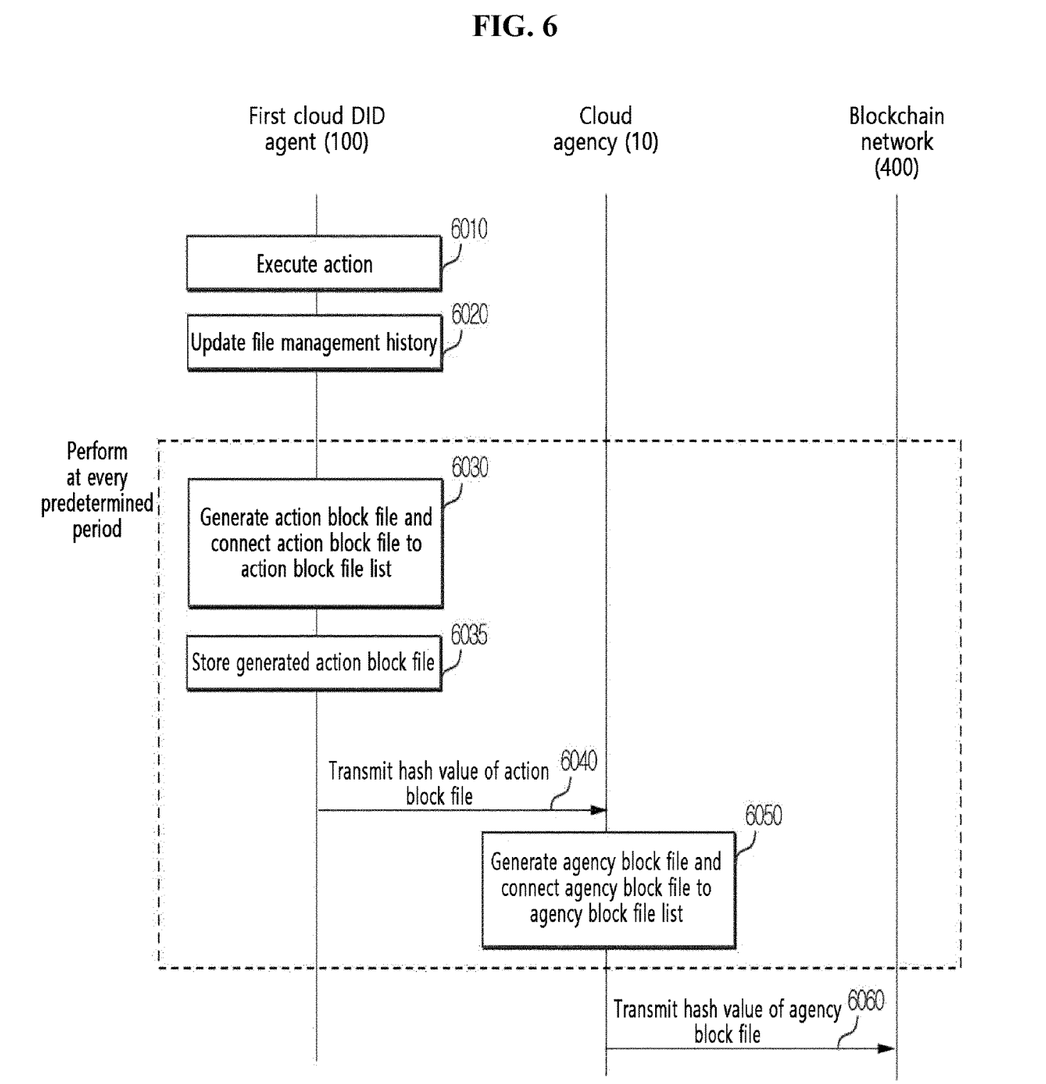
FIG. 6 is a sequence diagram of a method of generating the action block file list and the agency block file list in accordance with another exemplary embodiment.

FIG. 3 is a structural diagram for illustrating a block file list structure designed to enable verification of actions performed by the cloud DID agent 100 according to an embodiment. FIG. 4 is a structural diagram of an action block file list according to an embodiment. FIG. 5 is a structural diagram of an agency block file list according to an embodiment. FIG. 6 is a sequence diagram of a method of generating an action block file list and an agency block file list according to an embodiment. A method of generating the action block file list and the agency block file list will be described with reference to FIGS. 3 to 6 below.

Referring to FIG. 3, an example in which a first mobile agent 200 (e.g., mobile agent 200 in FIG. 1) and a second mobile agent 250 are using a cloud service is illustrated. The first cloud DID agent 100 (e.g., cloud DID agent 100 in FIG. 1) may act as an agent of the first mobile agent 200, and a second cloud DID agent 300 may act as the second mobile agent 250. The description of the first mobile agent 200 and the second mobile agent 250 is replaced with the description of the mobile agent 200 of FIG. 1 described above. The description of the first cloud DID agent 100 and the second cloud DID agent 300 is replaced with the description of the cloud DID agent 100 of FIG. 1 described above.

In one embodiment, a cloud agency 10 for managing a plurality of cloud agents 100 and 300 on the cloud service may be included. The cloud agency 10 may manage action details executed by the plurality of cloud agents 100 and 300 so that the action details can be verified through the blockchain network 400. Hereinafter, the DID, public key, and private key of the cloud agency 10 are referred to as an agency DID, agency public key, and agency private key, respectively. Although the first mobile agent 200 and the second mobile agent 250 are illustrated in FIG. 3 as an example, two or more mobile agents and corresponding cloud DID agents may be included in the cloud service.

The plurality of cloud DID agents 100 and 300 may have action block file lists 140 and 340 that respectively correspond to the cloud DID agents 100 and 300. The block file lists 140 and 340 may include a plurality of action block files. Hereinafter, a process of generating the action block file list and the agency block file list by the first cloud DID agent 100 will be described. The following description may also be applied to the second cloud DID agent 300 as well.

When the first cloud DID agent 100 executes an action (6010), the first cloud DID agent 100 may update the file management history 125 associated with the executed action (6020). The action may be performed by being requested by the mobile agents 200 and 250, or may be directly performed by the first cloud DID agent 100.

The first cloud DID agent 100 may generate an action block file for a plurality of actions executed during each predetermined period, at every predetermined period. Since the action block file includes an address value of the previous action block file (hash value of previous action block file), the action block file can be connected to the action block file list (6030). Therefore, as the action block files are connected through the hash value of the previous action block file, forgery or falsification of the data included in the action block file becomes impossible.

Referring to FIG. 4, a structure diagram of the first block file list 140 is illustrated as an example. The first block file list 140 includes a plurality of action block files. The action block files 4010, 4020, and 4030 may include action lists 4011, 4021, and 4031, time stamps 4013, 4023, and 4033, previous block file addresses 4015, 4025, and 4035, and user electronic signatures 4017, 4027, and 4037, respectively. The action block files 4010, 4020, and 4030 may constitute the action block file list 140 by including the previous block file addresses 4015, 4025, and 4035.

The action block files 4010, 4020, and 4030 may be generated when there is an action performed during the predetermined period. When there is no action performed during the period, an action block file corresponding to the period may be set not to be generated.

The action lists 4011, 4021, and 4031 may include action information on a plurality of actions executed during the predetermined period. Each action information may include an action type, data related to actions (e.g., file address (file identifier)), and a time stamp of each action. The action information may include, for example, file upload/download/modify/delete/retrieve/share as the action type, and may include the file address as data related to the actions. The action information may include DB read/write as the action type, and may include key/value as data related to the actions. The action information may include access right setting as the action type, and may include a third party DID, a permitted action type, and a file address for which the action is permitted as data related to the action.

The time stamps 4013, 4023, and 4033 may be understood as information about a specific time when the action block file is generated within the predetermined period. For example, the predetermined period may be set to 5 minutes or 10 minutes, and may be adjusted according to the cloud service environment.

The user electronic signatures 4017, 4027, and 4037 may be understood as user electronic signatures generated based on the user private key of the first agent DID agent 100 that generated the action block file. The user electronic signatures 4017, 4027, and 4037 are information about who a generator of the action block file is, and may be verified through the blockchain network 400.

The first cloud DID agent 100 may store the generated action block file in the storage space (e.g., memory 120 or external storage space) of the first cloud DID agent 100 implemented to be accessible through the content address described above (6035).

The first cloud DID agent 100 may transmit a hash value of the generated action block file to the cloud agency 10 (6040). In various embodiments, another cloud DID agent (e.g., second cloud DID agent 300) that has executed an action during the predetermined period may also generate an action block file and transmit a hash value of the generated action block file to the cloud agency 10.

The cloud agency 10 may generate an agency block file including the hash value received from at least one cloud DID agent 100 or 300 at every predetermined period. Since the agency block file includes an address value of the previous agency block file (hash value of previous agency block file), the agency block file can be connected to the agency block file list (6050). Accordingly, as the agency block files are connected through the hash value of the previous agency block file, forgery and falsification of data included in the agency block file becomes impossible.

Referring to FIG. 5, a structure diagram of an agency block file list 40 is illustrated as an example. The agency block file list 40 includes a plurality of agency block files 5010, 5020, and 5030. The agency block files 5010, 5020, and 5030 may include agent hash value lists 5011, 5021, and 5031, time stamps 5013, 5023, and 5033, previous block file addresses 5015, 5025, and 5035, and cloud agency electronic signatures 5017, 5027, and 5037, respectively. The agency block files 5010, 5020, and 5030 may constitute the agency block file list 40 by including the previous block file addresses 5015, 5025, and 5035.

The agency block files 5010, 5020, and 5030 may be generated when a hash value is received from at least one cloud DID agent 100 or 300 during the predetermined period. When there is no action block file generated by at least one cloud DID agents 100 and 300 during the predetermined period, an agency block file corresponding to the period may be set not to be generated.

The agent hash value lists 5011, 5021, and 5031 may respectively include hash values of action block files generated during the predetermined period. Each of the agent hash value lists 5011, 5021, and 5031 may include the DID of the cloud DID agent that generated the action block file and the hash value of the generated action block file.

The time stamps 5013, 5023, and 5033 may be understood as information about a specific time when the agency block file was generated within the predetermined period.

The agency electronic signatures 5017, 5027, and 5037 may be understood as agency electronic signatures generated based on the agency private key of the cloud agency 10 that generated the agency block file. The agency electronic signatures 5017, 5027, and 5037 are information on who the generator of the agency block file is, and may be verified through the blockchain network 400.

The cloud agency 10 may transmit the hash values of the generated agency block files 5010, 5020, and 5030 to the blockchain network 400 to be stored in the blockchain network 400 (6060).

The hash values of the agency block files 5010, 5020, and 5030 may be stored in hash information 420 of the blockchain network 400. Since the hash values of the agency block files 5010, 5020, and 5030 are recorded in the blockchain network 400 and the hash values of the action block files 4010, 4020, and 4030 are recorded in the agency block files 5010, 5020, 5030, information about action execution history of each of the cloud DID agents 100 and 300 can be verified through the blockchain network 400. Since the hash value changes when data in the block file is changed, it is possible to verify that the data is maintained without change after the hash values are generated and recorded. Therefore, even if the cloud DID agents 100 and 300 and the cloud agency 10 are not managed as a central server by a specific entity such as a company, a reliable cloud service can be provided.

In various embodiments, the first cloud DID agent 100 may receive a verification request for a certain first action block file from the first mobile agent 200. For example, the verification request may include a time value (time stamp) at which the first action block file was generated. The first cloud DID agent 100 or the first mobile agent 200 may acquire a first hash value based on the first action block file stored in the storage space of the first cloud DID agent 100.

The first cloud DID agent 100 may acquire a second hash value of the agency block file from the hash information 420 of the blockchain network 400. For example, the first cloud DID agent 100 may acquire, based on the time stamp value, the second hash value of the agency block file generated at the same period as the period in which the action block file is generated.

The first cloud DID agent 100 may access the agency block file based on the second hash value, and acquire a third hash value associated with the cloud DID agent 100 from the agency block file. For example, the third hash value of the first action block file of the first cloud DID agent 100 stored in the agent hash value lists 5011, 5021, and 5031 may be acquired.

The first cloud DID agent 100 may compare the first hash value and the third hash value. The third hash value is the hash value stored to be verifiable through the blockchain network when the action block file was generated. The first hash value of the action block file is the hash value stored in the storage space of the first cloud DID agent 100. That is, if the third hash value is the same as the first hash value, it can be verified that data included in the action block file is not forged or falsified after the action block file is generated.

The first cloud DID agent 100 may transmit a response to the verification request to the first mobile agent 200 based on a comparison result between the first hash value and the third hash value.

Figure 7:
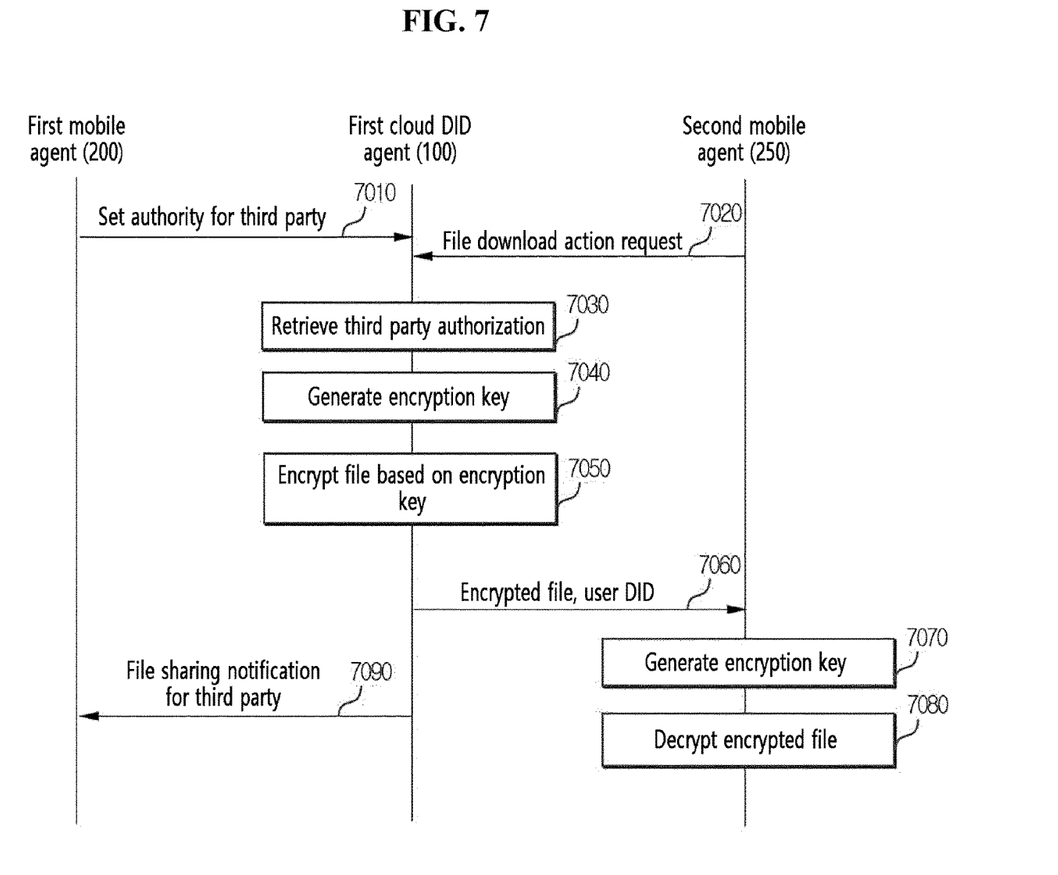
FIG. 7 is a sequence diagram of a method in which the cloud DID agent provides a file sharing function in accordance with another exemplary embodiment.

FIG. 7 is a sequence diagram of a method in which the cloud DID agent provides a file sharing function according to an embodiment. The cloud service according to the present invention may provide a file sharing function between cloud user devices (first mobile agent 200, second mobile agent 250).

Hereinafter, an example in which a user of the first mobile agent 200 allows a user of the second mobile agent 250 to share a file through the first cloud DID agent 100 will be described. In the embodiment disclosed through FIG. 7, authority setting is not limited to the file sharing function and may be performed for all actions on the cloud service. The second mobile agent 250 may execute all authorized actions by the first cloud DID agent 100. Hereinafter, the DID, public key, and private key of the second mobile agent 250 are respectively referred to as a third party DID, a third party public key, and a third party private key.

The first mobile agent 200 may set authority for a third party on the cloud service (7010). The first mobile agent 200 may set authority for the third party who is the user of the second mobile agent 250. For example, when the third party is a hospital, the user of the first mobile agent 200 may allow the hospital to download medical data. In various embodiments, the user of the first mobile agent 200 may set in advance whether or not to share data with various third parties who want to share data. In the embodiment of FIG. 7, it is assumed that download authority for a specific file is given to the second mobile agent 250.

The first cloud DID agent 100 may receive a download action request for the specific file from the second mobile agent 250 (7020). The download action request may include a download action command, a DID (third party DID) of the second mobile agent 250, and an electronic signature (a third party electronic signature) of the second mobile agent 250. The first cloud DID agent 100 may verify the electronic signature of the third party included in the download action request through the blockchain network 400. Through this verification, it can be verified whether or not the file download action request is transmitted from an owner of the third party DID.

The first cloud DID agent 100 may retrieve the third party authority information 123 of the memory 120 (7030). The third party authority information 123 may include whether or not a file download authority corresponding to the third party DID is granted. For example, the first cloud DID agent 100 may check whether or not the second mobile agent 250 has authority for the file download action based on the third party DID included in the download action request.

When it is checked that the authority of the third party DID is granted, the first cloud DID agent 100 may generate, based on the third party public key and the user private key, an encryption key, wherein the third party public key is acquired based on the third party DID included in the download action request (7040). For example, the first cloud DID agent 100 may acquire the third party public key corresponding to the third party DID through DID resolution for the DID document 410 of the blockchain network 400.

For security, the file can be transmitted as an encrypted file. The first cloud DID agent 100 and the second mobile agent 250 may perform Diffie-Hellman key exchange in order to generate an encryption key to be used in the symmetric key algorithm. The first cloud DID agent 100 and the second mobile agent 250 can generate the encryption key by exchanging the user public key and the third party public key with each other.

The first cloud DID agent 100 may encrypt a file to be transmitted to the second mobile agent 250 based on the encryption key generated in operation 7040 (7050). The first cloud DID agent 100 may transmit the encrypted file and the user DID to the second mobile agent 250 (7060). The first cloud DID agent 100 may transmit a file sharing notification for the third party to the first mobile agent 200 (7090).

The second mobile agent 250 may acquire the user public key from the blockchain network 400 based on the received user DID (DID resolution), and generate an encryption key based on the third party private key and the user public key (7070). The second mobile agent 250 may decrypt the encrypted file with the generated encryption key (7080).

Electronic devices according to various embodiments disclosed in this document may be devices of various types. The electronic devices may include, for example, a portable communication device (e.g. smartphone), a computer device, a portable multimedia device, a portable medical device, a camera, a wearable device, or a home appliance. The electronic device according to an embodiment of the present document is not limited to the aforementioned devices.

Various embodiments of this document and terms used therein are not intended to limit the technical features described in this document to specific embodiments, and should be understood to include various modifications, equivalents, or alternatives of the embodiments. In relation to the description of the drawings, similar reference numerals may be used for similar or related components. The singular form of a noun corresponding to an item may include one item or a plurality of items, unless the relevant context clearly dictates otherwise. In this document, each of phrases such as "A or B", "at least one of A and B", "at least one of A or B", "A, B or C", "at least one of A, B and C", and "at least one of A, B, or C" may include all possible combinations of items listed together in the corresponding phrase among those phrases. Terms such as "first", "second", "firstly", or "secondly" may simply be used to distinguish a corresponding component from other corresponding components, and do not limit the corresponding components in other respects (e.g., importance or order). In this document, if a certain (e.g., first) element is referred to as being "connected" or "coupled" with or without the terms "functionally" or "communicatively" to another (e.g., second) component, it means that the certain component can be connected to the other component directly (e.g., in a wired manner), wirelessly, or through a third component.

The term "module" used in this document may include a unit implemented in hardware, software or firmware, and may be used interchangeably with terms such as logic, logic block, component, or circuit, for example. The module may be an integrally constructed component or a minimal unit of the component or a portion thereof that performs one or more functions. For example, according to one embodiment, the module may be implemented in the form of an application-specific integrated circuit (ASIC).

Various embodiments of this document may be implemented as software including one or more instructions stored in a storage medium (e.g., memory 120, storage space) readable by a machine (e.g. cloud DID agents 100 and 300, mobile agents 200 and 250). For example, a processor (e.g. processor 110) of the machine may invoke at least one instruction among one or more instructions stored from the storage medium and execute the at least one instruction. This enables the machine to be operated to perform at least one function according to the at least one instruction invoked. The one or more instructions may include code generated by a compiler or code executable by an interpreter.

According to an embodiment, a method according to various embodiments disclosed in this document may be provided by being included in a computer program product. The computer program product may be traded between a seller and a buyer as a commodity. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of online distribution, at least part of the computer program product may be temporarily stored or tentatively generated in the machine-readable storage medium such as a memory of a manufacturer's server, application store server, or relay server.

According to various embodiments, each component (e.g., module or program) of the components described above may include one or a plurality of entities. According to various embodiments, one or more components among the components described above or operations may be omitted, or one or more other components or operations may be added. Alternatively or additionally, a plurality of components (e.g., modules or programs) may be integrated into one component. In this case, the integrated component may perform one or more functions of each component of the plurality of components identically or similarly to those functions performed by a corresponding component among the plurality of components prior to the integration. According to various embodiments, operations performed by modules, programs, or other components may be executed sequentially, in parallel, iteratively, or heuristically, or one or more of the operations may be executed in a different order or omitted, or, one or more other operations may be added.

According to the embodiments disclosed in this document, it is possible to provide a stable cloud service capable of stably recovering data even when some of cloud servers are damaged, while preventing external cloud servers from knowing information about an original uploaded file.

All action histories, such as file management history on the cloud service, can be managed verifiable by anyone through a public blockchain network.

In addition to this, various effects grasped directly or indirectly through this document may be provided.

Although the device for providing blockchain DID-based personal cloud service and its operating method have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A cloud DID agent comprising:
a memory; and
at least one processor, wherein
the at least one processor is configured to
receive an upload action request for a file from a mobile agent,
generate an encryption key corresponding to the file in response to the upload action request and encrypt the file based on the encryption key,
generate a plurality of chunks by dividing the encrypted file into a predetermined size,
generate a plurality of data blocks corresponding to each of the plurality of chunks,
execute an upload action by distributing and transmitting the plurality of data blocks to a plurality of external cloud servers so that the plurality of data blocks are distributed and stored in the plurality of external cloud servers,
generate an action block file for the plurality of actions including the upload action executed during a predetermined period,
transmit a first hash value of the action block file to a cloud agency,
acquire a second hash value of an agency block file including the first hash value when receiving a verification request for the action block file from the mobile agent,
access the agency block file based on the second hash value,
acquire a third hash value of the action block file from the agency block file,
compare the first hash value with the third hash value, and
transmit a response to the verification request to the mobile agent based on the comparison result.

2. The cloud DID agent of claim 1, wherein
the at least one processor is configured to
receive a download action request for the file from the mobile agent,
download at least some of the plurality of data blocks corresponding to each chunk included in the plurality of chunks from the plurality of external cloud servers in response to the download action request and recover each chunk based on the at least some of the plurality of data blocks,
recover the encrypted file based on the plurality of recovered chunks,
decrypt the recovered encrypted file using the encryption key, and
transmit the decrypted file to the mobile agent.

3. The cloud DID agent of claim 2, wherein
the memory stores a user DID, and
the at least one processor is configured to
verify a user electronic signature included in the upload action request and the download action request through a blockchain network based on the user DID.

4. The cloud DID agent of claim 1, wherein
the at least one processor is configured to
generate a predetermined number of the plurality of data blocks by performing erasure coding on one chunk included in the plurality of chunks.

5. The cloud DID agent of claim 1, wherein
the memory stores a user private key, and
the action block file includes
an address value of a previous action block file, information on the plurality of actions executed, a time stamp and an electronic signature generated based on the user private key.

6. The cloud DID agent of claim 5, wherein
the information on the plurality of actions executed includes an action type of each of the plurality of actions executed and data related to each action of the plurality of actions executed,
the address value of a previous action block file is a hash value of the previous action block file.

7. The cloud DID agent of claim 5, wherein
the at least one processor is configured to
store the first hash value of the action block file in a storage space of the cloud DID agent and transmits the first hash value to the cloud agency.

8. The cloud DID agent of claim 1, wherein
the memory stores
third party authority information, a user public key, and a user private key,
the at least one processor is configured to
verify a third party electronic signature included in a download action request through a blockchain network when receiving the download action request for the file from another mobile agent,
retrieve the third party authority information stored in the memory,
generate, based on a user private key and a third party public key, an encryption key, wherein the third party public key is acquired based on a third party DID included in the download action request,
encrypt the file based on the encryption key, and
transmit the encrypted file and a user DID to the another mobile agent.

9. The cloud DID agent of claim 8, wherein
the third party authority information includes
whether or not a file download authority corresponding to the third party DID is granted.

10. A method for providing a cloud service, the method comprising:
receiving, by a cloud DID agent, an upload action request for a file from a mobile agent;
generating, by the cloud DID agent, an encryption key corresponding to the file in response to the upload action request and encrypting the file based on the encryption key;
generating, by the cloud DID agent, a plurality of chunks by dividing the encrypted file into a predetermined size;
generating, by the cloud DID agent, a plurality of data blocks corresponding to each of the plurality of chunks; and
executing, by the cloud DID agent, an upload action by distributing and transmitting the plurality of data blocks to a plurality of external cloud servers, by the cloud DID agent, so that the plurality of data blocks are distributed and stored in the plurality of external cloud servers
generating, by the cloud DID agent, an action block file for the plurality of actions including the upload action executed during a predetermined period;
transmitting, by the cloud DID agent, a first hash value of the action block file to a cloud agency; and
generating, by a cloud agency, an agency block file including the first hash value, and transmitting a second hash value of the agency block file to a blockchain network.

11. The method of claim 10, further comprising:
receiving, by the cloud DID agent, a verification request for the action block file from the mobile agent;
acquiring, by the cloud DID agent, the first hash value from the action block file stored in a storage space of the cloud DID agent;
acquiring, by the cloud DID agent, the second hash value of the agency block file generated during the predetermined period from the blockchain network;
accessing, by the cloud DID agent, the agency block file based on the second hash value, and acquiring a third hash value of the action block file from the agency block file; and
comparing, by the cloud DID agent, the first hash value with the third hash value, and transmitting a response to the verification request to the mobile agent based on the comparison result.

12. The method of claim 10, further comprising:
performing, by the cloud DID agent, erasure coding on one chunk included in the plurality of chunks wherein the one chunk is recovered based on a second number of data blocks among a first number of plurality of data blocks, and a first number is greater than the second number,
wherein a third number of data blocks smaller than the second number is stored in one external cloud server included in the plurality of external cloud servers.

* * * * *